(12) United States Patent
Hotta (10) Patent No.: US 6,591,187 B2
(45) Date of Patent: Jul. 8, 2003

(54) MAP GENERATION DEVICE

(75) Inventor: Kazuyuki Hotta, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 42 days.

(21) Appl. No.: 09/758,368

(22) Filed: Jan. 12, 2001

(65) Prior Publication Data

US 2001/0001133 A1 May 10, 2001

Related U.S. Application Data

(63) Continuation of application No. PCT/JP99/02747, filed on May 25, 1999.

(51) Int. Cl.[7] ................................................. G05D 1/00
(52) U.S. Cl. ..................... 701/208; 701/200; 340/988; 340/995; 73/178 R
(58) Field of Search ................................. 701/200, 202, 701/206, 208, 214; 340/988, 995; 73/178 R (56) References Cited

U.S. PATENT DOCUMENTS 5,684,704 A * 11/1997 Okazaki .................... 701/208

FOREIGN PATENT DOCUMENTS

| JP | A561774 | 8/1993 |
|----|---------|--------|
| JP | A6137881 | 5/1994 |
| JP | A6325292 | 11/1994 |
| JP | A7209005 | 8/1995 |

* cited by examiner

Primary Examiner—Thomas G. Black
Assistant Examiner—Arthur D. Donnelly
(74) Attorney, Agent, or Firm—Birch, Stewart, Kolasch & Birch, LLP

(57) ABSTRACT

A map generation device is provided with an optimal road network information generation section (11) which extracts only arterial roads from the road map data stored in the road map data storage section (10) in accordance with a fixed determination standard and which generates information about a road network composed of the arterial roads as optimal road network information, and an optimal road map data storage section (12) which stores the generated optimal road network information.

6 Claims, 8 Drawing Sheets

ROAD CATEGORY IN SECTION A-B: NATIONAL ROAD
ROAD CATEGORY IN SECTION C-D: PREFECTURAL ROAD
ROAD CATEGORY IN SECTION E-F: OTHER ROAD

ROAD CATEGORY IN SECTION A-B: NATIONAL ROAD
ROAD CATEGORY IN SECTION C-D: PREFECTURAL ROAD
ROAD CATEGORY IN SECTION E-F: OTHER ROAD

ROAD WIDTH IN SECTION A-B: 13M
ROAD WIDTH IN SECTION C-D: 5.5M
ROAD WIDTH IN SECTION E-F: 13M

ROAD CATEGORY IN SECTION A-B: NATIONAL ROAD
ROAD WIDTH IN SECTION A-B: 13M
ROAD CATEGORY IN SECTION C-D: PREFECTURAL ROAD
ROAD WIDTH IN SECTION C-D: 5.5M
ROAD CATEGORY IN SECTION E-F: OTHER ROAD
ROAD WIDTH IN SECTION E-F: 13M

TRAFFIC FLOW IN SECTION A-B: 1500 VEHICLES/HOUR
TRAFFIC FLOW IN SECTION A-C: 100 VEHICLES/HOUR
TRAFFIC FLOW IN SECTION C-D: 500 VEHICLES/HOUR
TRAFFIC FLOW IN SECTION B-D: 500 VEHICLES/HOUR

MAP GENERATION DEVICE

CROSS-REFERENCE TO THE RELATED APPLICATION

This Application is a continuation of International Application No. PCT/JP99/02747, whose International filing date is May 25, 1999, the disclosures of which Application are incorporated by reference herein. The benefit of the filing and priority dates of the International Application is respectfully requested.

BACKGROUND OF THE INVENTION

1. Field of the Invention

The present invention relates to a map generation device which generates a road map used by a navigation device in response to the needs of a user.

2. Description of the Related Art

Figure 1:
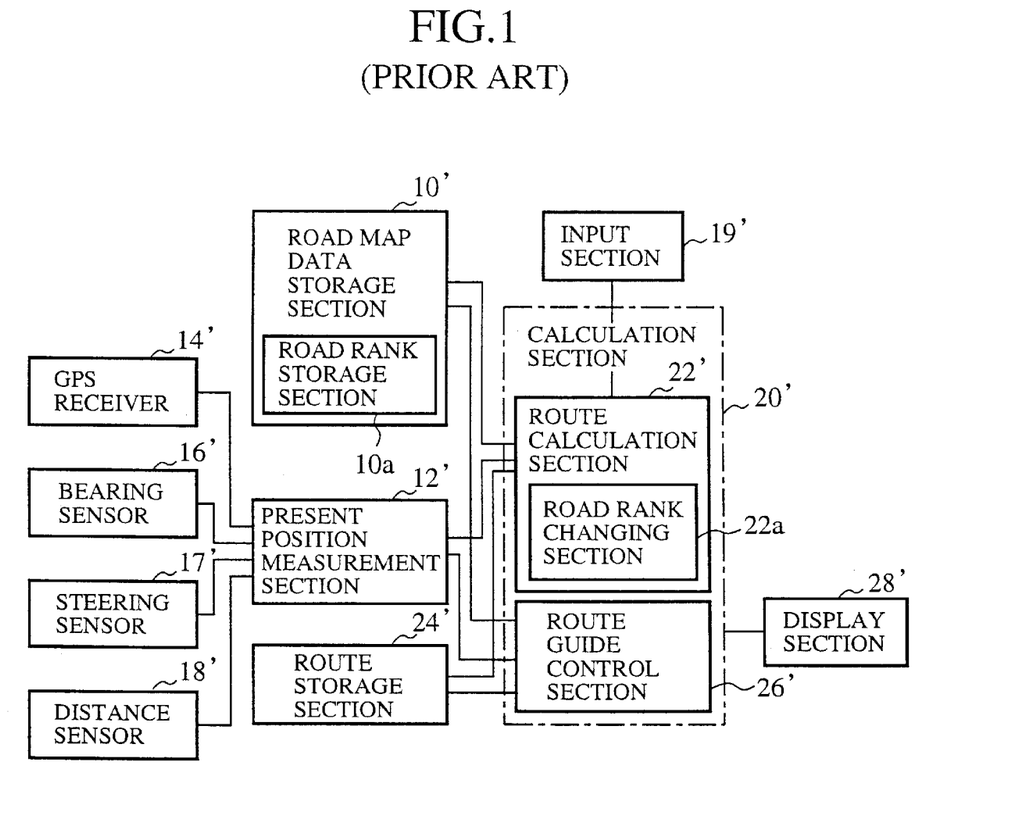
FIG. 1 is a block diagram of a navigation device including a conventional map generation device.

FIG. 1 is a block diagram of a navigation device including a conventional map generation device which generates a road map and which is disclosed for example in JP-A-6-137881. In the figure, reference numeral 10' denotes a road map data storage section for storing road map data containing roads, place names, building names and rivers, 14' is a GPS receiver which uses GPS to measure a present position of the vehicle, 16' is a bearing sensor for detecting a direction of travel of the vehicle based on geomagnetism, 17' is a steering sensor for detecting variation in a direction of motion by the operational angle of a steering wheel, 18' is a distance sensor for detecting a running distance by the number of rotations of the vehicle wheels, 12' is a present position measurement section which estimates a present position of the vehicle based on a detection result of the above sensors.

19' is an input section which sends a destination input by a user to the calculation section 20', 22' is a route calculation section which is provided in the calculation section 20' and which stores a route from the present position calculated by the present position measurement section 12' to a destination, 24' is a route storage section which stores the route calculated by the route calculation section 22', 26' is a route guide control section which is provided in the calculation section 20', which reads road map data in the periphery of the vehicle from the road map data storage section 10', which superimposes the route stored in the route storage section 24', the present position of the vehicle and the direction of travel of the vehicle on the road map data and which displays the result on the display section 28'. 10a is a road rank storage section for storing ranks which are applied to roads, 22a is a road rank changing section which changes the rank of a road.

The operation of the conventional map generation device will be described below.

A navigation device including this type of conventional map generation device can select, based on a road category, roads to be displayed in accordance with a scale of the display screen. A rank is applied to each road in accordance with its road category and the rank applied to each road is stored in the road rank storage section 10a. Thus, if a display of detail up to roads with narrow width is performed, the screen may become crowded with information and difficult to understand. In such a case, low rank roads are omitted from the display and only arterial roads may be displayed.

Furthermore, when a destination is input from the input section 19' by a user, the route calculation section 22' can perform route search to the destination using only main roads and arterial roads above a fixed rank as a search object. Thus, it is possible to reduce route searching time. However, when the route search is performed using only arterial roads as a search object, it is sometimes not possible to guide a route to the destination. In order to solve this problem, when a destination is input, the route calculation section 22' changes the rank of roads in the proximity of the destination by the road rank changing section 22a prior to the route searching so that those roads become search objects for the route search. In such a way, even when the rank of roads in the proximity of the destination is not as high as an arterial road, it is possible to guide a route to the destination.

Since the conventional map generation device is constructed as above, it is necessary for the calculation section 20' to read large amounts of map data during route searching, as a result, a large capacity memory must be provided which creates a high load on the hardware.

SUMMARY OF THE INVENTION

The present invention is proposed to solve the above problem and has the object of providing a map generation device which can limit road map data extracted from a road map data storage section, when searching a route, to that data required for needs of a driver. Thus, it is possible to perform high speed searching of a route and reduce the capacity of a memory by providing an optimal road map for the needs of the driver.

The map generation device of the present invention comprises an arterial road extraction means for extracting only arterial roads from the road map data stored in the road map storage means in accordance with a fixed determination standard and for generating information on a road network composed of the arterial roads as optimal road network information, and an optimal map storage means for storing the optimal road network information generated by the arterial road extraction means.

In such a way, as well as enabling high speed searching of a route, the capacity of a memory required to search the route can be reduced.

According to the present invention, the arterial road extraction means may be adapted to use a road category such as national road, prefectural road or the like as the fixed determination standard.

In such a way, as well as enabling high-speed searching of a route, the capacity of a memory required to search the route can be reduced.

Further, according to the present invention, the arterial road extraction means may be adapted to use a road width as the fixed determination standard.

In such a way, as well as enabling high-speed searching of a route, the capacity of a memory required to search the route can be reduced.

Furthermore, according to the present invention, the arterial road extraction means may be adapted to use both a road category such as national road, prefectural road or the like and a road width as the fixed determination standard.

In such a way, as well as enabling high-speed searching of a route, the capacity of a memory required to search the route can be reduced.

A map generation device of the present invention comprises a road map storage means for storing road map data, a point database storage means for storing information about the positions of a plurality of predetermined points, an optimal road network information generation means for extracting a road network composed of roads connecting the plural points from the road map data stored in the road map storage means according to the information stored in the point database storage means and for generating information about the road network as optimal road network information, and an optimal map storage means for storing the optimal road network information obtained by the optimal road network information generation means.

In such a way, as well as enabling high-speed searching of a route with respect to the predetermined points, the capacity of a memory required to search the route can be reduced.

A map generation device of the present invention comprises a road map storage means for storing road map data, a traffic flow database storage means for storing information relating to the traffic flow on the road and/or geographical points, an optimal road network information generation means for extracting a road network from the road map data stored in the road map storage means in accordance with the information stored in the traffic flow database storage means and for generating information about the road network as optimal road network information, and an optimal map storage means for storing the optimal road network information obtained by the optimal road network information generation means.

In such a way, as well as enabling high-speed searching of a route, the capacity of a memory required to search the route can be reduced.

DETAILED DESCRIPTION OF THE PREFERRED EMBODIMENTS

In order to describe the present invention in greater detail, the preferred embodiments will be outlined below with reference to the accompanying figures.

Embodiment 1

Figure 2:
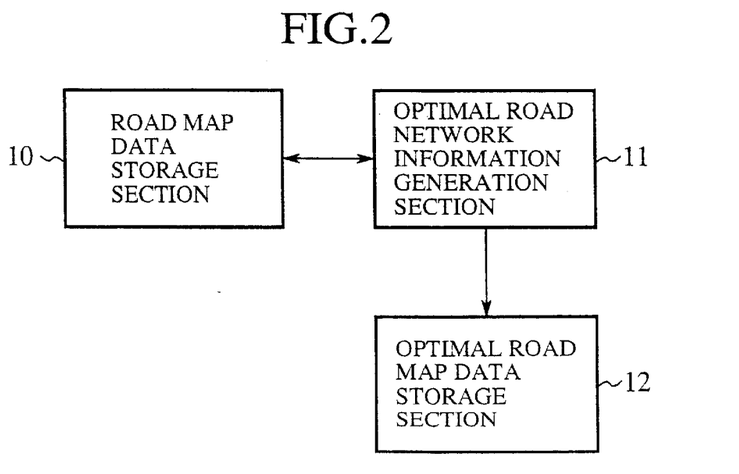
FIG. 2 is a block diagram of a navigation device including a map generation device according to a first embodiment of the present invention.

FIG. 2 is a block diagram of a navigation device including a map generation device according to a first embodiment of the present invention. In the figure, reference numeral 10 denotes a road map data storage section (road map storage means) for storing road map data, 11 is an optimal road network information generation section (arterial road extraction means), 12 is an optimal road map data storage section (optimal map storage means) for storing information with respect to optimal road networks.

The road map data storage section 10 stores vector data or raster data, which is digital road map data generated by digitalization, in a recording medium such as a CD-ROM, DVD or hard disk. Furthermore, various attribute information pertaining to roads, for example a road category such as expressway, national road or the like, a road name, road width, traffic restrictions, the number of lanes or a link category which performs distinctions such as divergence or non-divergence of a main line or ramp linking, are also stored in the recording medium.

The optimal road network information generation section 11 extracts only arterial roads such as tollways, prefectural roads and national roads from the road map data storage section 10 according to a fixed determination standard. Further, the optimal road network information generation section 11 calculates an optimal route connecting these roads and outputs the calculation result as optimal road network information.

The optimal road map data storage section 12 records and stores the optimal road network information extracted by the optimal road network information generation section 11.

Next, the operation of the map generation device according to this embodiment will be outlined below.

Figure 3:
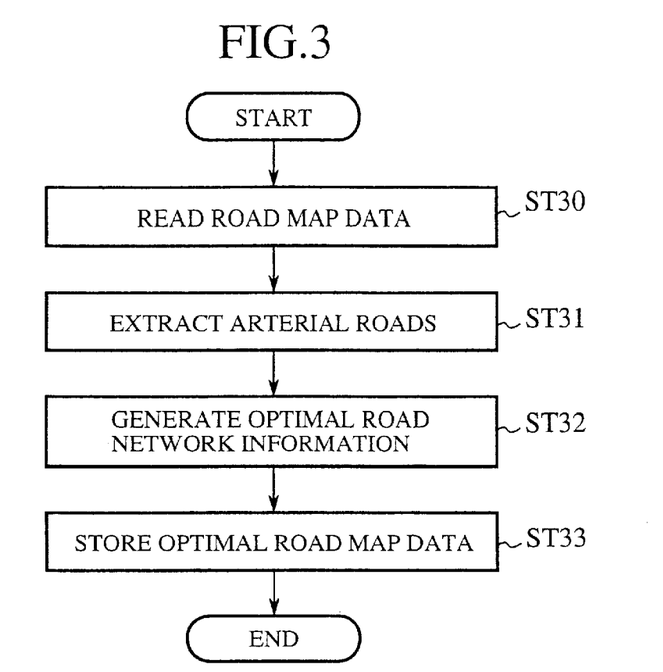
FIG. 3 is a flowchart showing the processing sequence of a map generation device according to the first embodiment of the present invention.

Hereafter, the process of generating the optimal road network information in the map generation device according to the first embodiment of the present invention will be described with reference to the flowchart as shown in FIG. 3.

Firstly, in a step ST30, the map generation device reads from the road map data storage section 10 vector data or raster data, which is digital road map data generated by digitalization, together with various attribute information pertaining to roads, for example, a road category such as expressway or national road, road name, road width, traffic restrictions, number of lanes, and a link category for performing distinctions such as divergence or non-divergence of a main line or ramp linking.

Figure 4:
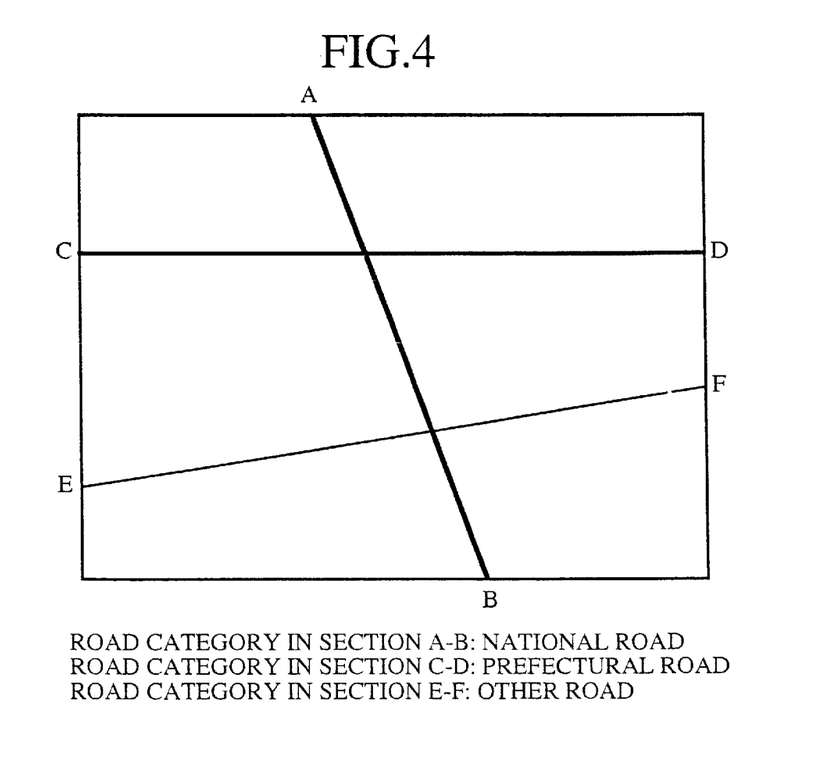
FIG. 4 is an example of a map generated by a map generation device according to the first embodiment of the present invention.

Next, in a step ST31, the optimal road network information generation section 11 of the map generation device extracts as arterial roads only national road in section A–B and prefectural road in section C–D from the road map data storage section 10 based on a fixed determination standard, in a case where, as shown for example in FIG. 4, the section A–B is defined as national road, C–D is defined as prefectural road and E–F is defined as other road. The road in section E–F is not extracted. Then, in a step ST32, the optimal road network information generation section 11 generates data with respect to the optimal road network composed of the arterial roads, that is to say, optimal road network information on the basis of the result of the step ST31.

Lastly, in a step ST33, the optimal road map data storage section 12 stores the optimal road network information generated in the step ST32 in a recording medium such as a CD-ROM, DVD or hard disk.

As shown above, according to this first embodiment, it is possible to perform high speed route searching and reduce a memory capacity required for the route searching by the provision of a road map including only arterial roads under a fixed determination standard in order to perform route searching.

Embodiment 2

The map generation device according to a second embodiment of the present invention adapts road categories as a fixed determination standard which is used for determining whether or not a road is an arterial road when performing the generation process of the optimal road network information. Since the structure of the map generation device according to this second embodiment is the same as that of the first embodiment, such description is omitted below.

The operation of the map generation device according to this embodiment will be outlined below.

Figure 5:
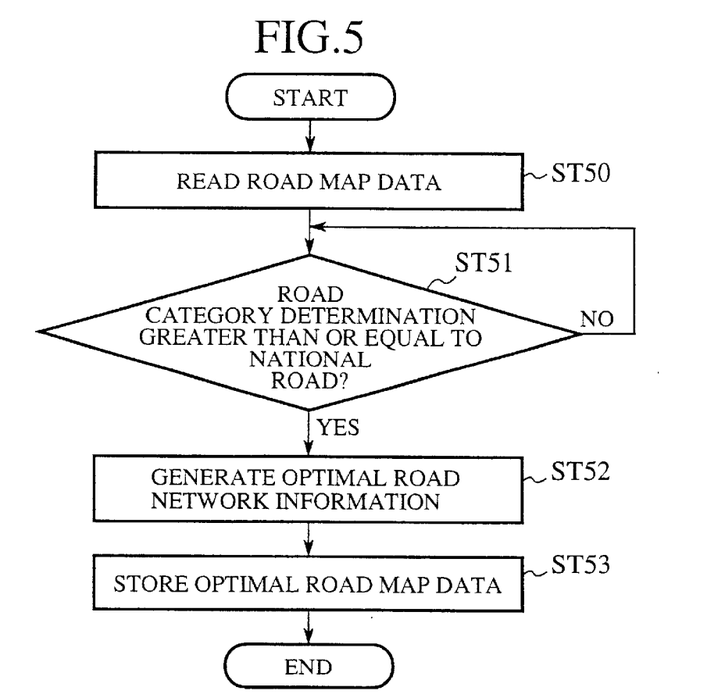
FIG. 5 is a flowchart showing the processing sequence of a map generation device according to a second embodiment of the present invention.

The process of generating the optimal road network information in the map generation device according to the second embodiment of the present invention will be described with reference to the flowchart shown in FIG. 5.

Firstly, in a step ST50, the map generation device reads from the road map data storage section 10 vector data or raster data, which is digital road map data generated by digitalization, together with various attribute information pertaining to roads, for example, a road category such as expressway or national road, road name, road width, traffic restrictions, number of lanes and a link category performing distinctions such as divergence or non-divergence of a main line or ramp linking.

Figure 6:
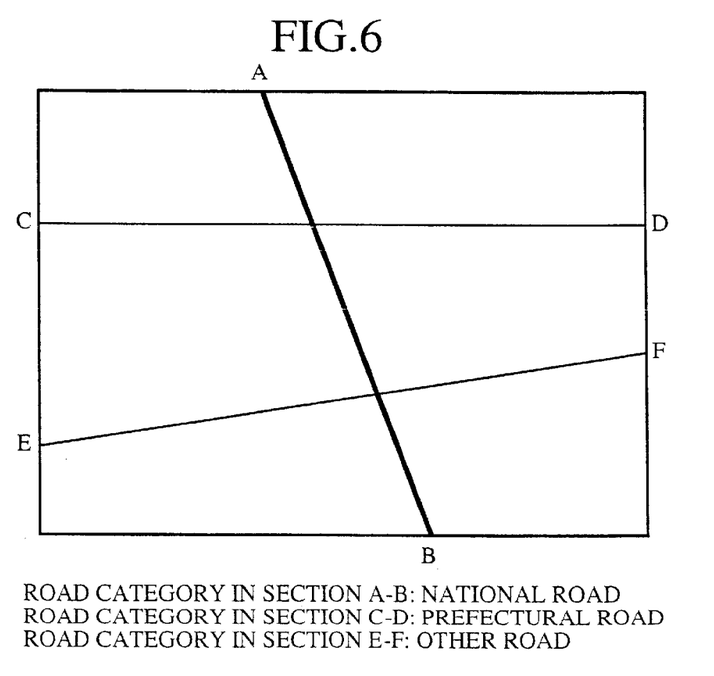
FIG. 6 is an example of a map generated by a map generation device according to the second embodiment of the present invention.

Next, in a step ST51, the optimal road network information generation section 11 of the map generation device determines the respective road category and extracts only a road in section A–B having a road category greater than or equal to a national road as an optimal route, in a case where, as shown for example in FIG. 6, the road category of section A–B is defined as national road, C–D is defined as prefectural road, E–F is defined as other road. Road in section C–D and road in section E–F are not extracted as these roads are determined not to be suitable. Of course, the determination standard for determining that a road having a road category greater than or equal to a national road is an arterial road is merely a parameter. Therefore, the determination standard may be changed according to the condition or purpose.

Then, in a step ST52, the optimal road network information generation section 11 generates data with respect to the optimal road network composed of the arterial roads, that is to say, optimal road network information on the basis of the result in the step ST51.

Finally, in a step ST53, the optimal road map data storage section 12 records and stores the optimal road network information generated in the step ST52 in a recording medium such as a CD-ROM, DVD or hard disk.

As shown above, according to this second embodiment, it is possible to perform high speed route searching and reduce a memory capacity required for the route searching by the provision of a road map including only arterial roads under a fixed determination standard using road category in order to perform route searching.

Embodiment 3

The map generation device according to a third embodiment of the present invention adapts road widths as a fixed determination standard which is used for determining whether or not a road is an arterial road when performing the generation process of the optimal road network information. Since the structure of the map generation device according to the third embodiment is the same as that of the first embodiment as shown in FIG. 2, such description is omitted below.

Next, the operation of the map generation device according to this embodiment will be outlined below.

Figure 7:
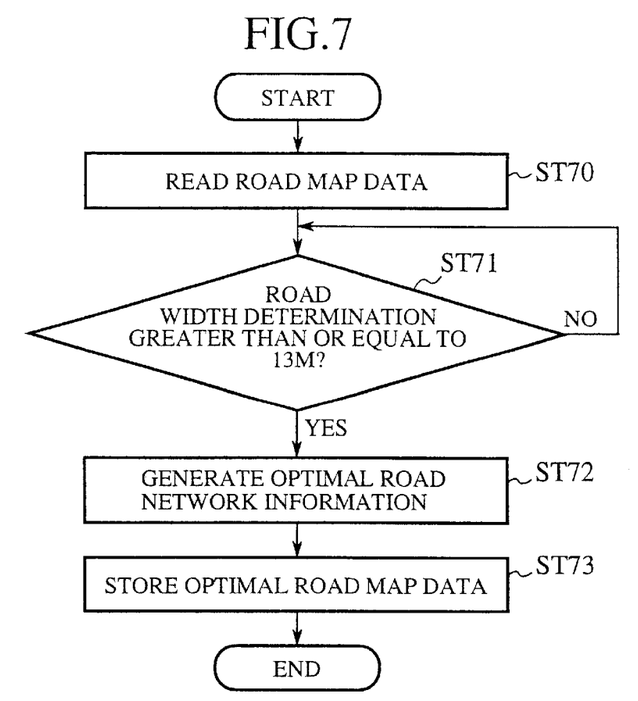
FIG. 7 is a flowchart showing the processing sequence of a map generation device according to a third embodiment of the present invention.

The process of generating the optimal road network information in the map generation device according to the third embodiment of the present invention will be described with reference to the flowchart shown in FIG. 7.

Firstly, in a step ST70, the map generation device reads from the road map data storage section 10 vector data and raster data, which is digital road map data generated by digitalization, together with various attribute information pertaining to roads, for example, a road category such as expressway or national road, road name, traffic restrictions, road width, number of lanes and a link category for performing distinctions such as divergence or non-divergence of main line or ramp linking.

Figure 8:
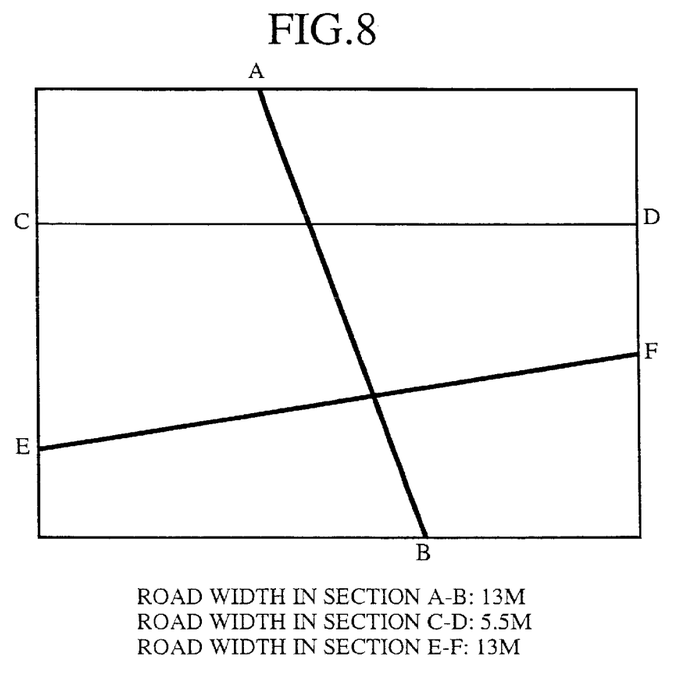
FIG. 8 is a flowchart showing the processing sequence of a map generation device according to the third embodiment of the present invention.

In a step ST71, as shown for example in FIG. 8 wherein a width of the road in section A–B is 13 m, a width of the road in section C–D is 5.5 m, and a width of the road in section E–F is 13 m, the optimal road network information generation section 11 of the map generation device determines the road width in respective sections. For example, it is determined that only roads in section A–B and in section E–F, the road width of which is greater than or equal to 13 m, are arterial roads. Such roads are extracted from the road map data storage section 10. Road in section C–D is not extracted as this road is determined not to be suitable. Of course, the determination standard for determining that a road having a road width greater than or equal to 13 m is an arterial road is merely a parameter. Thus, the determination standard may be changed according to the condition or purpose.

Then, in a step ST72, the optimal road network information generation section 11 generates data with respect to the optimal road network composed of the arterial roads, that is to say, optimal road network information on the basis of the result in the step ST71.

Lastly, in a step ST73, the optimal road map data storage section 12 records and stores the optimal road network information generated in the step ST72 in a recording medium such as a CD-ROM, DVD or hard disk.

As shown above, according to this third embodiment, it is possible to perform high speed route searching and reduce a memory capacity required for the route searching by the provision of a road map including only arterial roads under a fixed determination standard using road width in order to perform the route searching.

Embodiment 4

The map generation device according to a fourth embodiment of the present invention adopts both a road width and a road category as a fixed determination standard which is used for determining whether or not a road is an arterial road, when generating the optimal road network information. Since the structure of the map generation device according to the fourth embodiment is the same as that of the first embodiment as shown in FIG. 2, such description is omitted below.

The operation of the map generation device according to this embodiment will be outlined below.

Figure 9:
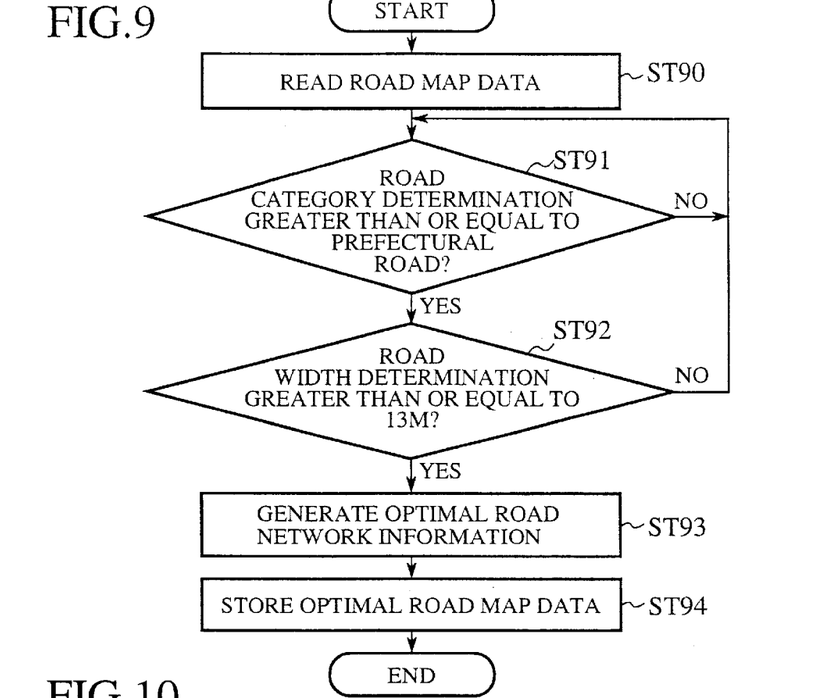
FIG. 9 is a flowchart showing the processing sequence of a map generation device according to a fourth embodiment of the present invention.

The process of generating the optimal road network information in the map generation device according to the fourth embodiment will be described with reference to the flowchart shown in FIG. 9.

Firstly, in a step ST90, the map generation device reads from the road map data storage section 10 vector data or raster data, which is digital road map data generated by digitalization, together with various attribute information pertaining to roads, for example, a road category such as expressway or national road, road name, traffic restrictions, road width, number of lanes, and a link category which performs distinctions such as divergence or non-divergence of main line or ramp linking.

Figure 10:
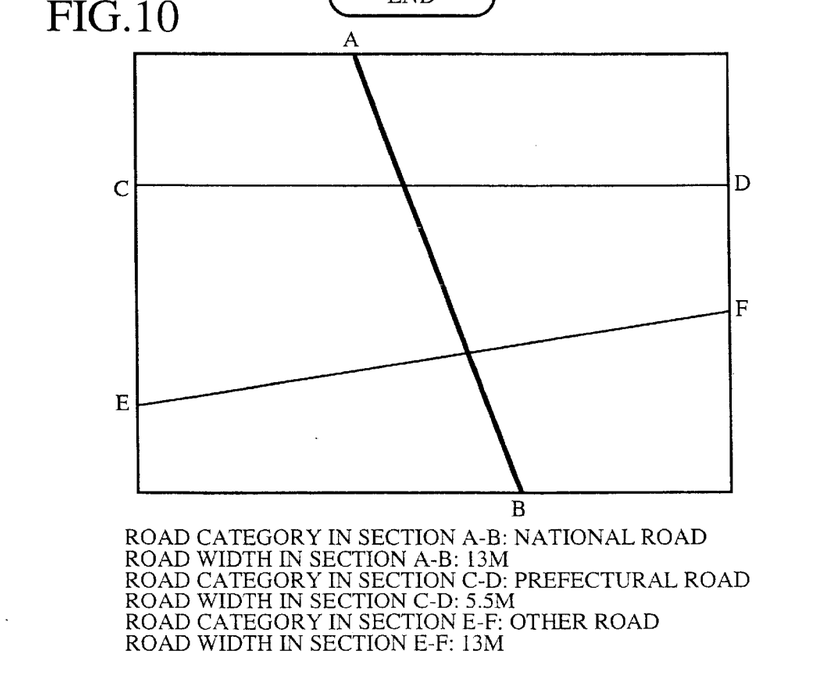
FIG. 10 is a flowchart showing the processing sequence of a map generation device according to the fourth embodiment of the present invention.

Next, in a step ST91, the optimal road network information generation section 11 of the map generation device determines the respective road category, in a case where, as shown for example in FIG. 10, the road category of section A–B is defined as national road with a road width of 13 m, C–D is defined as prefectural road with a road width of 5.5 m, E–F is defined as other road with a road width of 13 m. For example, it is determined that only roads in section A–B and in section C–D, which have a road category greater than or equal to prefectural road, are arterial roads, and such roads are extracted from the road map data storage section 10. Road in section E–F is determined to be not suitable and is not extracted. Of course, the determination standard in the step ST91 for determining that a road having a road category greater than or equal to national road is an arterial road is merely a parameter. Thus, the determination standard may be changed according to the condition or purpose.

Subsequently, in a step ST92, the optimal road network information generation section 11 determines whether or not the respective road widths of the roads extracted in the step ST91 satisfy a road width determination standard. For example, it is determined finally that only road in section A–B which has a road width of more than or equal to 13 m is an arterial road. As a result, this road is extracted. Road in section C–D is not extracted as this road is determined not to be suitable. Of course, the determination standard for determining that a road having a road width greater than or equal to 13 m is an arterial road is merely a parameter. Thus, the determination standard may be changed according to the condition or purpose.

Then, in a step ST93, the optimal road network information generation section 11 generates data with respect to the optimal road network composed of the arterial road, that is to say, optimal road network information on the basis of the result in the step ST92.

Lastly, in a step ST94, the optimal road map data storage section 12 records and stores the optimal road network information generated in the step ST93 in a recording medium such as a CD-ROM, DVD or hard disk.

As shown above, according to the fourth embodiment, it is possible to perform high speed route searching and reduce a memory capacity required for the route searching by the provision of a road map including only arterial roads in accordance with a fixed determination standard using both a road category and a road width in order to perform route searching.

Embodiment 5

Figure 11:
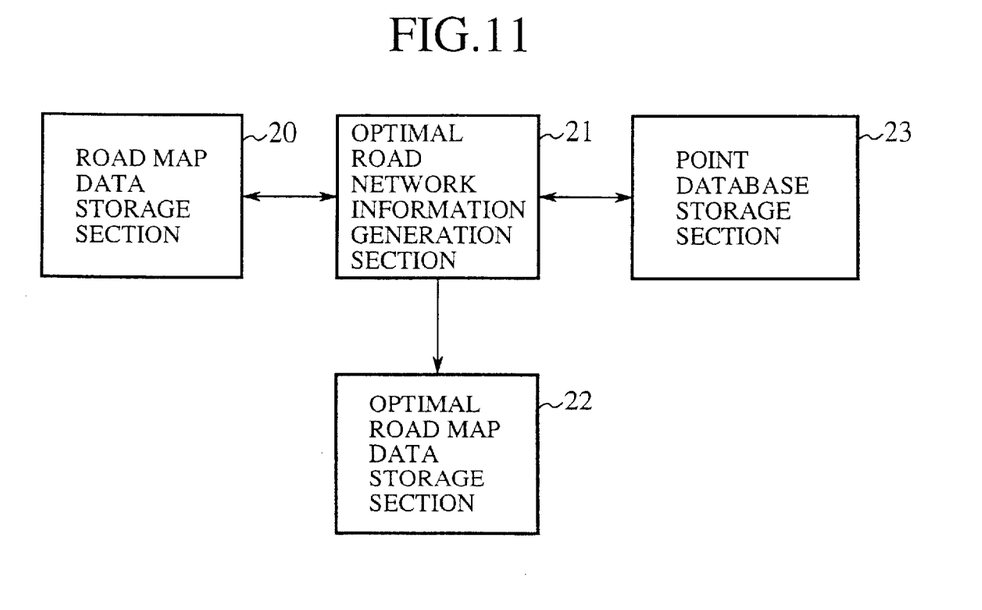
FIG. 11 is a block diagram of a map generation device according to a fifth embodiment of the present invention.

FIG. 11 is a block diagram showing the structure of a map generation device according to a fifth embodiment of the present invention. In the figure, reference numeral 20 denotes a road map data storage section (road map storage means) which stores road map data, 21 is an optimal road network information generation section (optimal road network information generation means), 22 is an optimal road map data storage section (optimal map storage means) for storing optimal road network information, and 23 is a point database storage section (point database storage means).

The road map data storage section 20 stores vector data or raster data, which is digital road map data generated by digitalization, in a recording medium such as a CD-ROM, DVD or a hard disk. Various attribute information pertaining to roads, for example, a road category such as expressway or national road, road name, traffic restrictions, road width, number of lanes and a link category which performs distinctions such as divergence or non-divergence of a main line or ramp linking are also stored in the recording medium.

The optimal road network information generation section 21 generates optimal road network information by calculating an optimal route connecting points on the basis of positional information with respect to the points stored in the point database storage section 23.

The optimal road map data storage section 22 records and stores the optimal road network information extracted by the optimal road network information generation section 21.

The points database storage section 23 is a database representing information about the position of the points, that is to say, a plurality of outlets of various types of industries such as delivery points for home delivery, all types of service industries such as department stores, convenience stores and shopping centers, or small shops.

The operation of the map generation device according to this embodiment will be outlined below.

Figure 12:
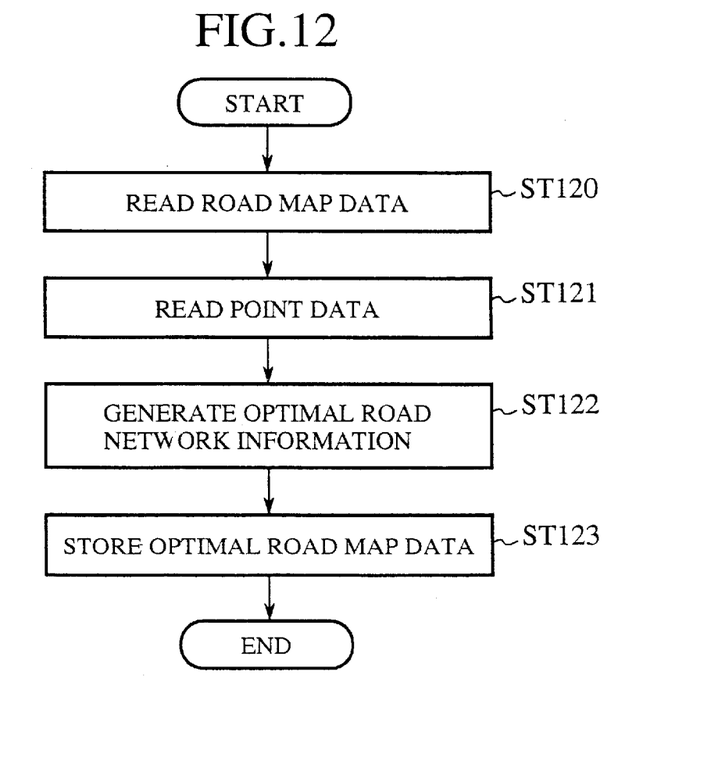
FIG. 12 is a flowchart showing the processing sequence of a map generation device according to the fifth embodiment of the present invention.

The process of generating the optimal road network information in the map generation device according to the fifth embodiment will be described with reference to the flowchart shown in FIG. 12.

Firstly, in a step ST120, the optimal route network information generation section 21 of the map generation device reads from the road map data storage section 20 vector data or raster data which is digital road map data generated by digitalization. This data is read with various attribute information pertaining to roads, for example a road category such as expressway or national road, a road name, traffic restrictions, road width, number of lanes, and a link category which performs distinctions such as divergence or non-divergence of a main line or ramp linking.

Next, in a step ST121, the optimal road network information generation section 21 reads information about the position of a plurality of points such as delivery points for home delivery, department stores, convenience stores and shopping centers from the point database storage section 23.

Figure 13:
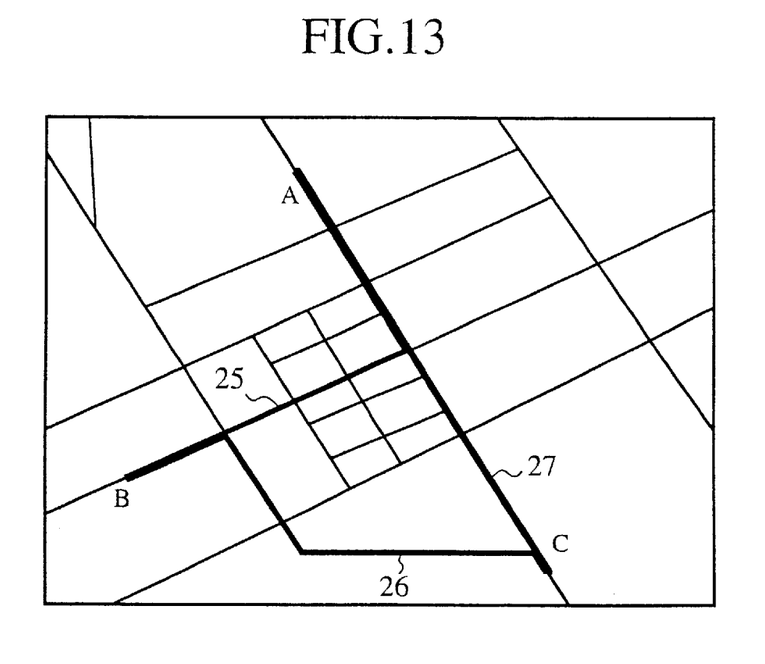
FIG. 13 is an example of a map generated by a map generation device according to the fifth embodiment of the present invention.

In a step ST122, when there are three points A, B, C as shown for example in FIG. 13, the optimal road network information generation section 21 of the map generation device firstly calculates a first optimal route 25 connecting the points A and B based on the positional information of the point A and the positional information of the point B which are read in the step 121. Next, a second optimal route 26 is calculated connecting the points B and C, and a third optimal route 27 is calculated connecting the points A and C. In this way, the optimal road network information generation section 21 calculates the optimal route with respect to all the combinations of the plural points read in the step ST121. Furthermore, for example with respect to the two points A and B, both the route from A to B and the route from B to A are calculated considering their directionality due to the influence of traffic restrictions and the like. The optimal road network information generation section 21 generates the optimal road network information based on these results.

Lastly, in a step ST123, the optimal road map data storage section 22 stores the optimal road network information generated in the step ST122 in a recording medium such as a CD-ROM, DVD or hard disk.

As shown above, according to the fifth embodiment, it is possible to perform high-speed route searching with respect to the fixed points by the provision of a road map connecting the fixed points in order to perform the route searching, thereby to reduce a memory capacity required for the route searching.

Embodiment 6

Figure 14:
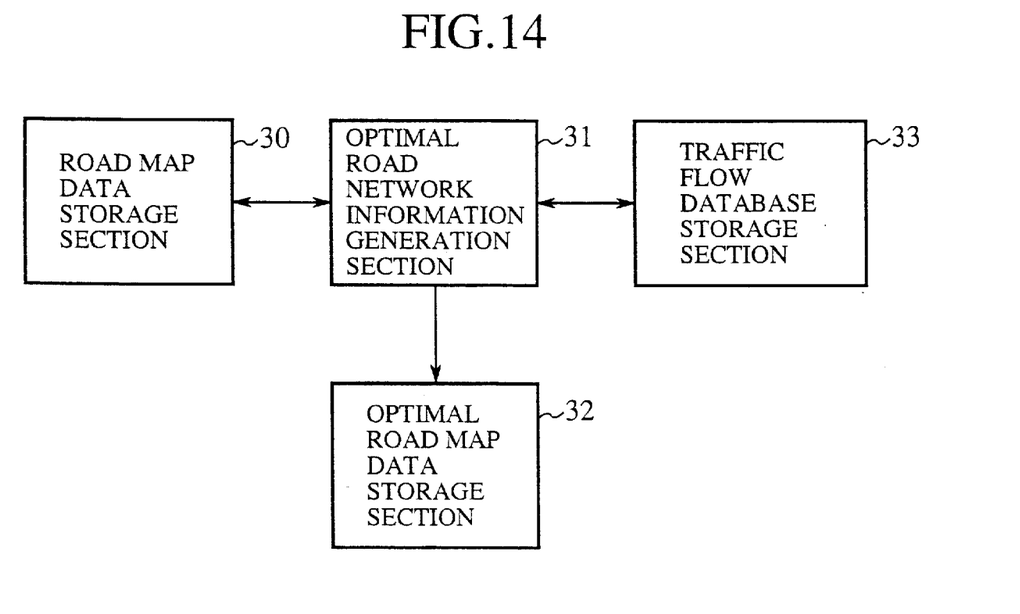
FIG. 14 is a block diagram of a map generation device according to a sixth embodiment of the present invention.

FIG. 14 is a block diagram showing the structure of a map generation device according to a sixth embodiment of the present invention. In the figure, reference numeral 30 denotes a road map data storage section (road map storage means) which stores road map data, 31 is an optimal road network information generation section (optimal road network information generation means), 32 is an optimal road map data storage section (optimal map storage means) for storing optimal road network information, and 33 is a vehicle traffic amount database storage section 23 (vehicle traffic amount database storage means).

The road map data storage section 30 stores vector data or raster data, which is digital road map data generated by digitalization, in a CD-ROM, DVD or a hard disk. Various attribute information pertaining to roads, for example a road category such as expressway or national road, road name, traffic restrictions, road width, number of lanes, and a link category which performs distinctions such as divergence or non-divergence of main line or ramp linking are also stored in the above recording medium.

The optimal road network information generation section 31 calculates an optimal route based on the traffic flow data stored in the vehicle traffic amount database storage section 33 and generates optimal road network information.

The optimal road map data storage section 32 records and stores the optimal road network information generated by the optimal road network information generation section 31.

The traffic flow database storage section 33 stores as a database statistical information showing amounts of traffic flow which are the result of studies with respect to the traffic flow of vehicles for a fixed period of time at specific sections, for example, between intersections.

The operation of the map generation device according to this embodiment will be outlined below.

Figure 15:
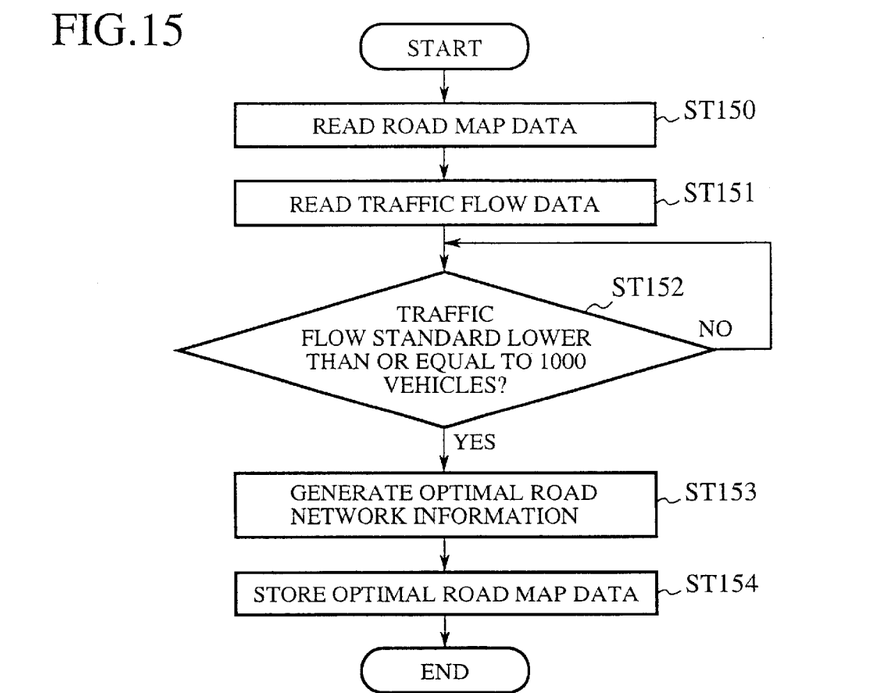
FIG. 15 is a flowchart showing the processing sequence of a map generation device according to the sixth embodiment of the present invention.

The process of generating the optimal road network information in the map generation device according to the sixth embodiment will be described with reference to the flowchart shown in FIG. 15.

Firstly, in a step ST150, the optimal road network information generation section 31 of the map generation device reads from the road map data storage section 30 vector data or raster data which is digital road map data generated by digitalization. This data is read with various attribute information pertaining to roads, for example a road category such as expressway or national road, road name, traffic restrictions, road width, number of lanes, and a link category which performs distinctions such as divergence or non-divergence of main line or ramp linking.

Next, in a step ST151, the optimal road network information generation section 31 reads from the traffic flow database storage section 33 data regarding the statistical information showing amounts of traffic such as a result of studies with respect to the traffic flow of vehicles for a fixed period of time at a specific section, for example between intersections.

Figure 16:
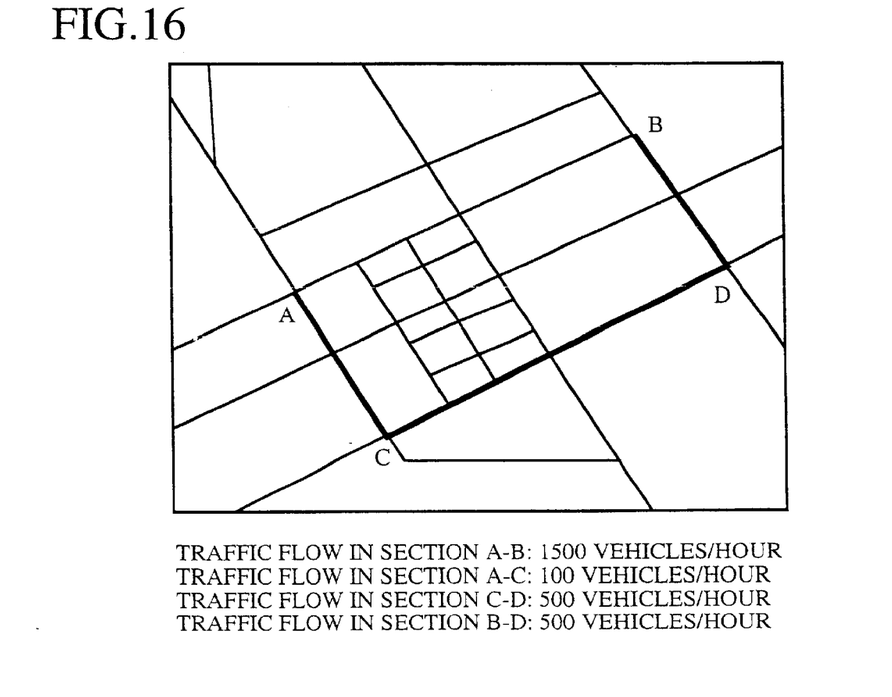
FIG. 16 is an example of a map generated by a map generation device according to the sixth embodiment of the present invention.

In a step ST152, the optimal road network information generation section 31 determines whether or not traffic flow amounts are greater than a determination standard. For example as shown in FIG. 16, when vehicle traffic flow amount data for intersection points A to D are respectively, traffic flow in section A–B: 1,500 (vehicles/hour), traffic flow in section A–C: 100 (vehicles/hour), traffic flow in section C–D: 500 (vehicles/hour) and traffic flow in section B–D: 500 (vehicles/hour), the optimal road network information generation section 31 determines whether or not respective traffic flow amounts are greater than a determination standard and extracts as optimal roads, for example, roads in sections A–C, C–D and B–D on which traffic flow is less than or equal to 1000 vehicles/hour from the map data storage section 30. Road in section A–B is not extracted as this road is determined to be unsuitable. Furthermore, in consideration of the fact that the traffic flow in one direction between the above two points may be considerably different from that in the other direction, the optimal road network information generation section 31 can set a direction in which travel is possible within that section. That is to say, the optimal road network information generation section 31 can cancel travel in a direction in which the flow of traffic is heavy. Of course, the determination standard for determining that a road having a traffic flow greater than 1000 vehicles per hour is unsuitable is merely a parameter. Thus, the determination standard may be changed according to conditions or purposes.

Then, in a step ST153, the optimal road network information generation section 31 generates data with respect to the optimal road network composed of the optimal roads, that is to say, the optimal road network information on the basis of the result in the step ST152.

Finally, in a step ST154, the optimal road map data storage section 32 records and stores the optimal road network information generated in the step ST153 in a recording medium such as a CD-ROM, DVD or hard disk.

As shown above, according to the sixth embodiment, it is possible to perform high-speed route searching by providing a road map containing only roads with low traffic flow in order to perform route searching, and reduce a memory capacity required for the route searching.

As shown above, the map generation device of the present invention extracts only a limited amount of data from the road map data storage section in accordance with the requirement of a driver and generates information regarding the road network optimal for the driver. Thus, the map generation device of the present invention is adapted for high-speed route searching.

What is claimed is:

1. A map generation device comprising:
   a road map storage means for storing road map data;
   an arterial road extraction means for extracting only arterial roads from the road map data stored in said road map storage means in accordance with a fixed determination standard, and for generating information about a road network composed of the arterial roads as optimal road network information; and
   an optimal map storage means for storing said optimal road network information generated by said arterial road extraction means.

2. The map generation device according to claim 1, wherein said arterial road extraction means uses a road category such as national road, prefectural road or the like as the fixed determination standard.

3. The map generation device according to claim 1, wherein said arterial road extraction means uses a road width as the fixed determination standard.

4. The map generation device according to claim 1, wherein said arterial road extraction means uses both a road category such as national road, prefectural road or the like and a road width as the fixed determination standard.

5. A map generation device comprising:

a road map storage means for storing road map data;

a point database storage means for storing information about the positions of a plurality of predetermined points;

an optimal road network information generation means for extracting a road network composed of roads connecting the plural points from the road map data stored in said road map storage means according to the information stored in said point database storage means and for generating information about the road network as optimal road network information; and an optimal map storage means for storing the optimal road network information obtained by said optimal road network information generation means.

6. A map generation device comprising:

a road map storage means for storing road map data;

a traffic flow database storage means for storing information relating to traffic flow at geographical points and/or roads;

an optimal road network information generation means for extracting a road network from the road map data stored in said road map storage means in accordance with the information stored in said traffic flow database storage means and for generating information about the road network as optimal road network information; and an optimal map storage means for storing the optimal road network information obtained by said optimal road network information generation means.

* * * * *